United States Patent
Schulz-Dobrick et al.

(10) Patent No.: US 9,090,482 B2
(45) Date of Patent: Jul. 28, 2015

(54) PROCESS FOR PREPARING MODIFIED MIXED TRANSITION METAL OXIDES

(75) Inventors: Martin Schulz-Dobrick, Mannheim (DE); Bastian Ewald, Ludwigshafen (DE); Jordan Keith Lampert, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 865 days.

(21) Appl. No.: 13/236,858

(22) Filed: Sep. 20, 2011

(65) Prior Publication Data

US 2012/0068108 A1 Mar. 22, 2012

Related U.S. Application Data

(60) Provisional application No. 61/384,722, filed on Sep. 21, 2010.

(51) Int. Cl.

| | | |
|---|---|---|
| *H01M 4/485* | (2010.01) | |
| *H01M 4/525* | (2010.01) | |
| *C01G 53/00* | (2006.01) | |
| *H01M 4/48* | (2010.01) | |
| *H01M 4/505* | (2010.01) | |
| H01M 4/62 | (2006.01) | |
| H01M 10/052 | (2010.01) | |
| H01M 10/0569 | (2010.01) | |

(52) U.S. Cl.
CPC ............. *C01G 53/44* (2013.01); *C01G 53/006* (2013.01); *H01M 4/48* (2013.01); *H01M 4/485* (2013.01); *H01M 4/505* (2013.01); *H01M 4/525* (2013.01); *C01P 2002/52* (2013.01); *C01P 2006/40* (2013.01); *H01M 4/625* (2013.01); *H01M 10/052* (2013.01); *H01M 10/0569* (2013.01); *H01M 2300/0028* (2013.01); *Y02E 60/122* (2013.01)

(58) Field of Classification Search
CPC ..... H01M 4/505; H01M 4/525; H01M 4/485; H01M 4/1391; H01M 4/131; H01M 4/56; H01M 4/52; H01M 4/32; H01M 6/18; H01M 4/48
USPC ........ 252/182.1; 429/231.1, 223, 224, 231.95
See application file for complete search history.

(56) References Cited

U.S. PATENT DOCUMENTS

| | | |
|---|---|---|
| 2002/0110736 A1 | 8/2002 | Kweon et al. |
| 2007/0292761 A1* | 12/2007 | Park et al. ..................... 429/223 |
| 2008/0118428 A1 | 5/2008 | Awano et al. |
| 2009/0087362 A1* | 4/2009 | Sun et al. ................... 423/179.5 |
| 2009/0286157 A1 | 11/2009 | Chen et al. |

FOREIGN PATENT DOCUMENTS

| | | |
|---|---|---|
| EP | 1 189 296 A2 | 3/2002 |
| EP | 1 296 391 A1 | 3/2003 |
| WO | WO 2012/038269 A1 | 3/2012 |

OTHER PUBLICATIONS

U.S. Appl. No. 13/824,097, filed Mar. 15, 2013, Schulz-Dobrick, et al.
U.S. Appl. No. 13/302,007, filed Nov. 22, 2011, Schulz-Dobrick, et al.
U.S. Appl. No. 13/302,370, filed Nov. 22, 2011, Schulz-Dobrick, et al.
U.S. Appl. No. 13/764,936, filed Feb. 12, 2013, Volkov, et al.
International Search Report Issued Jun. 19, 2012 in PCT/EP2011/065597 (with English Translation of Categories of cited Documents).

* cited by examiner

*Primary Examiner* — Mark Kopec
*Assistant Examiner* — Haidung Nguyen
(74) *Attorney, Agent, or Firm* — Oblon, McClelland, Maier & Neustadt, L.L.P.

(57) ABSTRACT

A process for preparing modified mixed transition metal oxides, which comprises treating a precursor of a mixed oxide which comprises lithium and at least two transition metals as cations with at least one substance which is selected from compounds of phosphorus, silicon, titanium, boron or aluminum having at least one phenoxy or alkoxy group or at least one halogen.

10 Claims, No Drawings

PROCESS FOR PREPARING MODIFIED MIXED TRANSITION METAL OXIDES

CROSS REFERENCE TO RELATED APPLICATION

This application claims the benefit of U.S. provisional application No. 61/384,722, filed on Sep. 21, 2010.

The present invention relates to a process for preparing modified mixed transition metal oxides, which comprises treating a precursor of a mixed transition metal oxide which comprises lithium and at least two transition metals as cations with at least one substance which is selected from compounds of phosphorus, silicon, titanium, boron or aluminum having at least one phenoxy or alkoxy group or at least one halogen.

The present invention further relates to mixtures of oxides, hydroxides, phosphates, carbonates and/or oxyhydroxides, in particulate form, of at least two elements of groups 3 to 12 of the Periodic Table of the Elements, which have been modified with 0.01 to 1% by weight of at least one element selected from Ti and Si in the +4 oxidation state, B in the +3 oxidation state, and P in the +3 or +5 oxidation state.

The present invention further relates to the use of the inventive mixtures of oxides, hydroxides, phosphates, carbonates and/or oxyhydroxides in particulate form.

In order to improve the energy density of the electrochemical cells based on such electrodes, which are generally quite heavy, there is a constant search for improved electrode materials with improved charging/discharging performance. In the search for advantageous electrode materials for batteries which utilize lithium ions as the conductive species, numerous materials have been proposed to date, for example lithium-containing spinels, mixed oxides, for example lithiated nickel-manganese-cobalt oxides and lithium-iron phosphates. Particular attention is being dedicated to the mixed oxides containing lithium cations.

The preparation of mixed oxides containing lithium cations is known in principle. First, a precursor is provided by preparing, for example, oxides, hydroxides, carbonates or similar salts of transition metals and mixing them with one another, for example grinding them with one another, or by coprecipitation in just one step; see, for example, EP 1 189 296 A and EP 1 296 391 A. This is followed by mixing with a lithium compound, preferably with $Li_2O$, $LiOH$ or $Li_2CO_3$, and then reaction at high temperature, for example at 800 to 1000° C. This gives a mixed transition metal oxide, which is admixed with carbon in an electrically conductive polymorph and optionally with one or more binders.

US 2009/0286157 proposes a process for surface modification of electrodes for lithium ion batteries, by means of which the evolution of gas in the course of operation of a lithium ion battery can be reduced. The process for surface modification is based on reaction of electrode materials with silanes or organometallic compounds.

However, there are also electrode materials which exhibit charging/discharging performance which is in need of improvement, even though they do not exhibit any evolution of gas in the course of operation.

It was thus an object of the present invention to provide a process for producing electrochemical cells which exhibit improved charging/discharging performance over the prior art and are producible from readily available materials. It was a further object of the present invention to provide constituents for lithium ion batteries.

Accordingly, the process defined at the outset has been found, also referred to as "process according to the invention" for short.

The process according to the invention proceeds from a precursor of a mixed oxide which comprises lithium and at least two transition metals as cations. In the context of the present invention, this is understood to mean the precursor of a mixed oxide which comprises lithium and at least two transition metals as cations, and is referred to as precursor for short. The precursor itself may comprise lithium cations, but it need not comprise any lithium cations. The precursor preferably does not comprise any lithium cations.

The precursor preferably comprises at least two transition metals as cations, and in particular embodiments three or four different transition metals.

Examples of anions include oxide ions, hydroxide ions, carbonate ions and combinations of the aforementioned anions.

Many elements are ubiquitous. For example, sodium, potassium and chloride are detectable in certain very small proportions in virtually all inorganic materials. In the context of the present invention, proportions of less than 0.1% by weight of cations or anions are disregarded. A precursor which comprises less than 0.1% by weight of sodium is thus considered to be sodium-free in the context of the present invention. Correspondingly, a precursor which comprises less than 0.1% by weight of sulfate ions is considered to be sulfate-free in the context of the present invention.

In one embodiment of the present invention, the precursor comprises in the range from 0.1 to 1% by weight of alkali metal ions other than lithium ions, especially sodium ions. Preference is given, however, to the use of precursors which do not have any alkali metal ions other than lithium cations.

In one embodiment of the present invention, the precursor comprises in the range from 0.1 to 2% by weight of sulfate ions, or nitrate ions or acetate ions. Preference is given, however, to the use of precursors which are free of sulfate ions, nitrate ions and acetate ions.

In one embodiment of the present invention, the precursor comprises in the range from 0.1 to 5% by weight of fluoride ions. In another embodiment of the present invention, the precursor is free of fluoride ions.

In one embodiment of the present invention, the precursor comprises in the range from 0.1 to 2% by weight of halide ions, other than fluoride, especially chloride. Preference is given to the use of precursors which are free of halide ions other than fluoride.

In one embodiment of the present invention, as precursor of a mixed oxide, at least one hydroxide, phosphate, oxyhydroxide or carbonate of at least one element of groups 3 to 12 of the Periodic Table of the Elements is selected. Preference is given to selecting, as the precursor of a mixed oxide, a mixture of hydroxides, phosphates, carbonates, oxyhydroxides or oxides of at least two elements of groups 3 to 12 of the Periodic Table of the Elements.

It is possible, for example, to select a mixture of carbonates of two or three different elements of groups 3 to 12 of the Periodic Table of the Elements. It is also possible to select a mixture of hydroxides of two or three different elements of groups 3 to 12 of the Periodic Table of the Elements. It is also possible to select a mixture of oxyhydroxides of two or three different elements of groups 3 to 12 of the Periodic Table of the Elements.

In one embodiment of the present invention, a mixture of a carbonate of an element of groups 3 to 12 of the Periodic Table of the Elements with a hydroxide, oxyhydroxide or phosphate of one or more elements of groups 3 to 12 of the Periodic Table of the Elements is selected.

In another embodiment of the present invention, a mixture of a hydroxide of an element of groups 3 to 12 of the Periodic Table of the Elements with a carbonate, oxyhydroxide or phosphate of one or more elements of groups 3 to 12 of the Periodic Table of the Elements is selected.

In another embodiment of the present invention, a mixture of an oxyhydroxide of an element of groups 3 to 12 of the Periodic Table of the Elements with a carbonate, hydroxide or phosphate of one or more elements of groups 3 to 12 of the Periodic Table of the Elements is selected.

In another embodiment of the present invention, a mixture of a phosphate of an element of groups 3 to 12 of the Periodic Table of the Elements with a carbonate, oxyhydroxide or hydroxide of one or more elements of groups 3 to 12 of the Periodic Table of the Elements is selected.

In another embodiment of the present invention, a mixture of a carbonate of an element of groups 3 to 12 of the Periodic Table of the Elements with a hydroxide of another element of groups 3 to 12 of the Periodic Table of the Elements with an oxyhydroxide or a phosphate of a further element of groups 3 to 12 of the Periodic Table of the Elements is selected.

In one embodiment of the present invention, transition metals are selected from combinations of at least two of the elements nickel, cobalt, titanium, vanadium, chromium, manganese and iron, preferably from combinations of at least three of the aforementioned transition metals, particular preference being given to combinations of nickel and manganese and at least one further transition metal among those mentioned above, particular preference being given to combinations of nickel, manganese and cobalt.

In this case, any desired ratios are possible. For example, it is possible to use nickel, cobalt and manganese in molar ratios such as 1:1:1 or such as 5:2:3 or such as 4:2:4 or such as 22:12:66 or such as 1:0:3 or such as 5:1:4.

In one embodiment of the present invention, up to 10% by weight, preferably up to 1% by weight, of transition metal is replaced by $Mg^{2+}$, $Ca^{2+}$ or $Al^{3+}$. In another embodiment, the precursor is free of $Mg^{2+}$, $Ca^{2+}$ and $Al^{3+}$.

In the context of the present invention, precursor preferably comprises water in physisorbed or chemically bound form, for example in the range from 0.1 to 10% by weight, preferably up to 2% by weight. In this context, an exact distinction between physisorbed and chemically bound water is not a simple matter in many cases, and so it is advisable to refer generally to water content.

According to the invention, precursor is treated with at least one substance which is selected from compounds of phosphorus, silicon, boron, titanium or aluminum having at least one alkoxy group or at least one halogen per mole. The substances selected are those substances which are in gaseous or liquid form in the course of performance of the inventive treatment, or can be dissolved in at least one gram/liter in organic solvent.

In one embodiment of the present invention, the process according to the invention is performed in such a way that substance which is selected from compounds of phosphorus, silicon, boron, titanium or aluminum having at least one alkoxy group or at least one halogen per mole is used in gaseous form.

In one embodiment of the present invention, the process according to the invention is performed in such a way that substance which is selected from compounds of phosphorus, silicon, boron, titanium or aluminum having at least one alkoxy group or at least one halogen per mole is used in liquid form, specifically in substance.

In another embodiment of the present invention, the process according to the invention is performed in such a way that a solution of substance which is selected from compounds of phosphorus, silicon, boron, titanium or aluminum having at least one alkoxy group or at least one halogen per mole is used, in which case the solvent(s) is/are selected from organic solvents.

In one embodiment of the present invention, treatment is effected with at least one compound of boron having at least one alkoxy group or at least one halogen per mole, also referred to in the context of the present invention as compound of boron or boron compound for short.

In one embodiment of the present invention, compounds of boron are selected from compounds of the formula $B(X^1)_a(R^2)_{3-a}$, where the variables are each defined as follows:

$X^1$ may be different or the same and is selected from halogen, phenoxy groups and alkoxy groups, especially of the formula $OR^1$, $R^1$ is selected from phenyl and preferably $C_1$-$C_6$-alkyl, cyclic or linear, for example methyl, ethyl, n-propyl, isopropyl, n-butyl, isobutyl, sec-butyl, tert-butyl, n-pentyl, cyclopentyl, isoamyl, isopentyl, n-hexyl, isohexyl, cyclohexyl, and 1,3-dimethylbutyl, preferably n-$C_1$-$C_6$-alkyl, more preferably methyl, ethyl, n-propyl, isopropyl, and most preferably methyl or ethyl. If a substance has two or more alkoxy groups per mole, $R^1$ may be different or preferably the same, and may be selected from the aforementioned $C_1$-$C_6$-alkyl radicals.

$R^2$ is selected from phenyl and preferably $C_1$-$C_6$-alkyl, for example methyl, ethyl, n-propyl, isopropyl, n-butyl, isobutyl, sec-butyl, tert-butyl, n-pentyl, isoamyl, isopentyl, n-hexyl, isohexyl and 1,3-dimethylbutyl, preferably n-$C_1$-$C_6$-alkyl, more preferably methyl, ethyl, n-propyl, isopropyl, and most preferably methyl or ethyl.

In the context of the present invention, halogen may also be abbreviated as $X^2$, and is selected from iodine, bromine, preferably chlorine and more preferably fluorine.

a is in the range from one to three.

Examples of preferred boron compounds are $C_6H_5$—$B(X^2)_2$, especially $C_6H_5$—$BCl_2$, $C_6H_5$—$BF_2$, cyclo-$C_6H_{11}$—$BCl_2$, cyclo-$C_6H_{11}$—$BF_2$, $BCl_3$, $B(CH_3)_3$, $B(C_2H_5)_3$, $B(CH_3)_2F$, $B(CH_3)_2Cl$, $B(C_2H_5)_2F$, $B(C_2H_5)_2Cl$, $CH_3$—$BF_2$, $CH_3$—$BCl_2$, $C_2H_5$—$BF_2$, iso-$C_3H_7$—$BCl_2$, iso-$C_3H_7$—$BF_2$, $C_2H_5$—$BCl_2$, $CH_3O$—$B(CH_3)_2$, $C_2H_5O$—$B(CH_3)_2$, $CH_3O$—$B(C_2H_5)_2$, $C_2H_5O$—$B(C_2H_5)_2Cl$, $B(OC_2H_5)_3$, $B(OCH_3)_3$, $B(OC_2H_5)_3$, $B(iso-OC_3H_7)_3$, $BF_3$.

Particularly preferred boron compounds are $B(OCH_3)_3$ and $BF_3$.

In one embodiment of the present invention, compounds of aluminum are selected from $Al(CH_3)_3$, $AlF_3$, $AlCl_3$, $AlBr_3$, $Al(OCH_3)_3$, $Al(C_2H_5)_3$, $Al(OC_2H_6)_3$, $Al(iso-OC_3H_7)_3$ and methylaluminoxane (MAO).

In one embodiment of the present invention, treatment is effected with $AlF_3$ which is obtained in situ during the inventive treatment, for example from ammonium fluoride and aluminum nitrate.

In one embodiment of the present invention, treatment is effected with at least one compound of titanium having at least one alkoxy group or at least one halogen per mole, also referred to in the context of the present invention as compound of titanium for short.

In one embodiment of the present invention, compounds of titanium are selected from those comprising titanium in the +4 oxidation state. Preference is given to compounds of the formula $Ti(R^2)_m(X^1)_{4-m}$ where the variables are each defined as follows:

$R^2$ are the same or different and are each selected from phenyl and $C_1$-$C_6$-alkyl, cyclic or linear, as defined above, $X^1$ are the same or different and are each selected from fluorine, chlorine, bromine, iodine, phenoxy and O—$C_1$-$C_6$-alkyl, as defined above, m is in the range from zero to three, preferably zero to two, and especially zero.

Examples of particularly suitable compounds of titanium are $TiCl_4$, $TiBr_4$, $Ti(OCH_3)_4$, $Ti(OC_2H_5)_4$ and $Ti(OC_2H_6)_2$ (iso-$C_3H_7)_2$.

In one embodiment of the present invention, treatment is effected with at least one compound of silicon having at least one alkoxy group or at least one halogen per mole, also referred to in the context of the present invention as compound of silicon for short.

In one embodiment of the present invention, compounds of silicon are selected from compounds of the formula $Si(R^2)_m(X^1)_{4-m}$ where the variables are each defined as follows:
$R^2$ are the same or different and are each selected from phenyl and $C_1$-$C_6$-alkyl, cyclic or linear, as defined above,
$X^1$ are the same or different and are each selected from fluorine, chlorine, bromine, iodine and O—$C_1$-$C_6$-alkyl, as defined above,
m is in the range from zero to four, preferably zero to two, and especially zero.

Examples of particularly suitable compounds of silicon are $SiCl_4$, $SiBr_4$, $Si(OCH_3)_4$, $Si(OC_2H_5)_4$, $Si(OC_2H_5)_2$ (iso-$C_3H_7)_2$, $CH_3SiCl_3$, $(CH_3)_2SiCl_2$, $(CH_3)_3SiCl$, $CH_3Si(OCH_3)_3$, $(CH_3)_2Si(OCH_3)_2$, $(CH_3)_3Si$—$OCH_3$, $C_6H_5SiCl_3$ and $C_6H_5(CH_3)_2SiCl$.

In one embodiment of the present invention, treatment is effected with at least one compound of phosphorus having at least one alkoxy group or at least one halogen per mole, also referred to in the context of the present invention as compound of phosphorus for short.

In one embodiment of the present invention, compounds of phosphorus are selected from compounds of the formulae $O=P(X^1)_3$, $O=P(OH)_2(OR^3)_2$, $O=P(OH)_2(OR^3)$, $O=PR^5(OH)(OR^3)$, $O=P(R^5)_2(OR^3)$, $O=P(R^5)_2(OH)$, $O=P(R^5)_3$, $P(X^1)_3$, $P(OH)(OR^3)_2$, $P(OH)_2(OR^3)$, $PR^5(OR^3)_2$, $PR^5(OH)(OR^3)$, $P(R^5)_2(OH)$ and $P(R^3)_3$.

In one embodiment of the present invention, compound of phosphorus is selected from dialkyl alkylphosphonates of the general formula $R^5$—$P(O)(OR^1)_2$, in alternative notation $O=PR^5(OR^1)_2$, or dialkyl alkylphosphonates of the formula $R^5$—$P(O)(OR^3)(OR^4)$, where the variables are each defined as follows:
$R^3$, $R^4$ are each the same or different and are selected from hydrogen, phenyl and $C_1$-$C_4$-alkyl,
$R^5$ is selected from hydrogen, phenyl, $C_3$-$C_7$-cycloalkyl and $C_1$-$C_6$-alkyl. If possible, $R^5$ are different or preferably the same.

Instead of compounds where $R^3$ or $R^4$ is hydrogen, it is also possible to use one or more corresponding salts, for example alkali metal salts or ammonium salts. Alkali metal salts include potassium salts and especially sodium salts. Ammonium salts include salts of suitable amines, for example of $C_1$-$C_4$-alkylamine, di-$C_1$-$C_4$-alkylamine and tri-$C_1$-$C_4$-alkylamine, where alkyl groups in di-$C_1$-$C_4$-alkylamines and tri-$C_1$-$C_4$-alkylamines may be different or preferably the same. Also suitable are salts of alkanolamine, especially ethanolamine, for example ethanolamine, N,N-diethanolamine, N,N,N-triethanolamine, N-methylethanolamine, N,N-dimethylethanolamine, N-methyldiethanolamine and N-n-butylethanolamine.

The process according to the invention can be performed in the gas phase or in the liquid (condensed) phase. A treatment in the gas phase is understood to mean that the phosphorus compound(s), silicon compound(s), titanium compound(s), boron compound(s) or aluminum compound(s) are present predominantly, i.e. to an extent of at least 50 mol %, in the gaseous state. The precursor(s) are of course not present in the gas phase in the course of performance of the process according to the invention.

A treatment in the liquid phase is understood to mean that the phosphorus compound(s), silicon compound(s), titanium compound(s), boron compound(s) or aluminum compound(s) are used in dissolved, emulsified or suspended form or, if they are liquid at the treatment temperature, in substance. The precursor(s) is/are in solid form in the course of performance of the process according to the invention.

In one embodiment of the present invention, precursor is treated with phosphorus compound(s), silicon compound(s), titanium compound(s), boron compound(s) or aluminum compound(s) at temperatures in the range from −20 to +1000° C., preferably +20 to +900° C.

In one embodiment of the present invention, precursor is treated with phosphorus compound(s), silicon compound(s), titanium compound(s), boron compound(s) or aluminum compound(s) in the presence of a solvent or dispersant. Suitable solvents are, for example, aliphatic or aromatic hydrocarbons, organic carbonates, and also ethers, acetals, ketals and aprotic amides, ketones and alcohols. Examples include: n-heptane, n-decane, decahydronaphthalene, cyclohexane, toluene, ethylbenzene, ortho-, meta- and para-xylene, dimethyl carbonate, diethyl carbonate, methyl ethyl carbonate, ethylene carbonate, propylene carbonate, diethyl ether, diisopropyl ether, di-n-butyl ether, methyl tert-butyl ether, 1,2-dimethoxyethane, 1,1-dimethoxyethane, 1,2-diethoxyethane, 1,1-diethoxyethane, tetrahydrofuran (THF), 1,4-dioxane, 1,3-dioxolane, N,N-dimethylformamide, N,N-dimethylacetamide and N-methylpyrrolidone, acetone, methyl ethyl ketone, cyclohexanone, methanol, ethanol and isopropanol.

In one embodiment of the present invention, phosphorus compound, silicon compound, titanium compound, boron compound or aluminum compound is used in gaseous form, for example in pure form or with a carrier gas. Suitable carrier gases are, for example, nitrogen, noble gases, for example argon, and also oxygen or air.

In one embodiment of the present invention, 1 to 99% by volume of carrier gas and 99 to 1% by volume of gaseous phosphorus compound, silicon compound, titanium compound, boron compound or aluminum compound are employed, preferably 5 to 95% by volume of carrier gas and 95 to 5% by volume of gaseous phosphorus compound, silicon compound, titanium compound, boron compound or aluminum compound.

In one embodiment of the present invention, the process according to the invention is performed at standard pressure.

In another embodiment of the present invention, the process according to the invention is performed at elevated pressure, for example at 1.1 to 20 bar.

In another embodiment of the present invention, the process according to the invention is performed at reduced pressure, for example at 0.5 to 900 mbar, especially at 5 to 500 mbar.

In one embodiment of the present invention, the process according to the invention can be performed over a period in the range from 1 minute up to 24 hours, preferably in the range from 10 minutes to 3 hours.

In one embodiment of the present invention, a weight ratio of mixed oxide to phosphorus compound, silicon compound, titanium compound, boron compound or aluminum compound in a ratio of 0.01:1 to 1000:1 is selected.

In one embodiment of the present invention, precursor is treated with one phosphorus compound, silicon compound, titanium compound, boron compound or aluminum compound. In another embodiment, mixed oxide is treated with two different phosphorus compounds, silicon compounds, titanium compounds, boron compounds or aluminum compounds or with a combination of, for example, one phosphorus compound and one titanium compound, for example simultaneously or successively.

Of course, it is possible in accordance with the invention to treat not only one precursor, but also mixtures of two or more precursors.

In one embodiment of the present invention, the inventive treatment of precursor with phosphorus compound, silicon compound, titanium compound, boron compound or aluminum compound is performed in the absence of lithium compounds. On completion of the treatment of precursor with phosphorus compound, silicon compound, titanium compound, boron compound or aluminum compound, reaction is then effected with at least one lithium compound, preferably with at least one lithium salt. Preferred lithium compounds are selected from LiOH, $Li_2O$, $LiNO_3$ and $Li_2CO_3$.

In another embodiment of the present invention, precursor is treated, simultaneously with the treatment with phosphorus compound, silicon compound, titanium compound, boron compound or aluminum compound, with at least one lithium compound, preferably at least one lithium salt which is preferably selected from LiOH, $Li_2O$, $LiNO_3$ and $Li_2CO_3$. For this purpose, the procedure may be, for example, to mix precursor with lithium compound, for example in a solids mixer, and then to treat the mixture thus obtained with phosphorus compound, silicon compound, titanium compound, boron compound or aluminum compound.

The vessel(s) in which the inventive treatment is to be performed can be selected according to the desired treatment temperature. For example, it is possible to select tanks or stirred flasks when the temperature is to be kept at not more than 300° C. If the temperature for performance of the process according to the invention is to be kept at least temporarily above 300° C., it is preferred to select a furnace as the vessel, for example a rotary tube furnace, a push-through furnace, a muffle furnace or a pendulum kiln.

Of course, it is also possible to select a combination of two or more reaction vessels, for example a cascade composed of a stirred tank and a rotary tube furnace.

In the inventive treatment of precursor with phosphorus compound, silicon compound, titanium compound, boron compound or aluminum compound, it is possible for gaseous by-products to be released under the reaction conditions, for example alcohols $R^1$—OH or hydrogen halides, especially HCl or HBr. Such by-products can be removed easily from the mixed transition metal oxide.

In one variant of the present invention, the inventive treatment of precursor with phosphorus compound, silicon compound, titanium compound, boron compound or aluminum compound forms HF. In such cases, F can be incorporated into the crystal lattice of mixed oxide.

When the treatment of precursor with phosphorus compound, silicon compound, titanium compound, boron compound or aluminum compound has been carried out in the gas phase, it is possible, for example, to remove unconverted phosphorus compound, silicon compound, titanium compound, boron compound or aluminum compound and any by-products by purging with pure inert gas, by evacuating or by baking out, optionally under reduced pressure.

When the treatment of precursor with phosphorus compound, silicon compound, titanium compound, boron compound or aluminum compound has been performed in the liquid phase in the presence of solvent, for example, unconverted phosphorus compound, silicon compound, titanium compound, boron compound or aluminum compound and solvent can be removed by filtration, extractive washing, distillative removal of solvent, evaporation of boron compound and/or solvent or extraction, or by a combination of one or more of the aforementioned measures.

Subsequently, precursor treated in accordance with the invention can be thermally aftertreated, for example at 100° C. to 1000° C., preferably 200° C. to 600° C. A thermal aftertreatment can be performed under air or inert carrier gas.

In one embodiment of the present invention, a pendulum furnace, a push-through furnace or a rotary tube furnace is selected for the thermal aftertreatment.

In one embodiment of the present invention, the thermal aftertreatment is performed over a period in the range from one minute to 24 hours, preferably 30 minutes to 4 hours.

In one embodiment of the present invention, the procedure is to treat precursor in a mixture with at least one further constituent of electrodes, together with phosphorus compound, silicon compound, titanium compound, boron compound or aluminum compound, constituents of electrodes being selected from carbon, a precursor for carbon and polymeric binder. This gives an electrode material which comprises modified mixed transition metal oxide.

In another embodiment of the present invention, the procedure is to treat precursor alone with phosphorus compound, silicon compound, titanium compound, boron compound or aluminum compound, i.e. in the absence of carbon, a precursor for carbon and polymeric binder. This gives a modified mixed transition metal oxide.

Modified mixed transition metal oxide or electrode material which comprises modified mixed transition metal oxide is generally obtained in particulate form.

Materials produced by the process according to the invention are very suitable as, or for production of, electrode material. The present application therefore further provides modified mixed transition metal oxides and electrode materials produced by the process according to the invention. They have not only the positive properties of the parent mixed oxides, but also have very good free flow and can therefore be processed in an excellent manner to give electrodes.

The present invention further provides mixtures of oxides, hydroxides, phosphates, carbonates and/or oxyhydroxides, in particulate form, of at least two elements of groups 3 to 12 of the Periodic Table of the Elements, which have been modified with 0.01 to 1% by weight of at least one element selected from Ti and Si in the +4 oxidation state, B and Al in the +3 oxidation state, and P in the +3 or +5 oxidation state. They can be processed further very efficiently to give mixed transition metal oxides which comprise lithium and at least two elements of groups 3 to 12 of the Periodic Table of the Elements, especially by calcining, for example at temperatures in the range from 600 to 1000° C.

Without wishing to commit to a theory, it can be assumed that mixed transition metal oxide can be modified with boron or aluminum in the +3 oxidation state, which means that boron or aluminum assumes transition metal sites in the crystal lattice, or—in another variant—that boron or aluminum has formed a compound with one or more metals of groups 3 to 12 of the Periodic Table of the Elements.

In another embodiment of the present invention, it can be assumed—without committing to a theory—that mixed transition metal oxide can be modified with titanium or silicon in the +4 oxidation state, which means that titanium or silicon occupies transition metal sites in the crystal lattice, or—in another variant—that titanium or silicon has formed a compound with one or more metals of groups 3 to 12 of the Periodic Table of the Elements.

In another embodiment of the present invention, it can be assumed—without committing to a theory—that mixed transition metal oxide has been modified with phosphorus in the +3 or +5 oxidation state, which means that phosphorus occupies transition metal sites in the crystal lattice, or—in another variant—that phosphorus has formed a compound with one or more metals of groups 3 to 12 of the Periodic Table of the Elements.

In one embodiment of the present invention, the modification with boron in the +3 oxidation state is additionally so homogeneous that the concentration deviates preferably by not more than ±20 mol %, measured at the surface of particles of mixed oxide, more preferably by not more than ±10 mol %.

Inventive modified mixed transition metal oxide comprises, as well as transition metal, also lithium as cations. In one embodiment of the present invention, inventive modified mixed transition metal oxide comprises equal molar proportions of lithium ions and of transition metal ions. In another embodiment of the present invention, inventive modified mixed transition metal oxide comprises an excess of lithium ions, based on transition metal ions, for example in the range from 0.1 to 15 mol %, preferably 1 to 10 mol %.

Elements such as potassium and sodium are ubiquitous at least in traces. In the context of the present invention, proportions of sodium or potassium in the range of 0.01% by weight or less shall therefore not be considered as a constituent of mixed transition metal oxide.

Inventive electrode materials have very good processibility, for example owing to their good free flow, and exhibit very good cycling stability when electrochemical cells are produced using inventive modified mixed transition metal oxide.

Inventive electrode material may further comprise carbon in an electrically conductive polymorph, for example in the form of carbon black, graphite, graphene, carbon nanotubes or activated carbon.

Inventive electrode material may further comprise at least one binder, for example a polymeric binder.

Suitable binders are preferably selected from organic (co)polymers. Suitable (co)polymers, i.e. homopolymers or copolymers, can be selected, for example, from (co)polymers obtainable by anionic, catalytic or free-radical (co)polymerization, especially from polyethylene, polyacrylonitrile, polybutadiene, polystyrene, and copolymers of at least two comonomers selected from ethylene, propylene, styrene, (meth)acrylonitrile and 1,3-butadiene. Polypropylene is also suitable. Polyisoprene and polyacrylates are additionally suitable. Particular preference is given to polyacrylonitrile.

In the context of the present invention, polyacrylonitrile is understood to mean not only polyacrylonitrile homopolymers but also copolymers of acrylonitrile with 1,3-butadiene or styrene. Preference is given to polyacrylonitrile homopolymers.

In the context of the present invention, polyethylene is not only understood to mean homopolyethylene, but also copolymers of ethylene which comprise at least 50 mol % of copolymerized ethylene and up to 50 mol % of at least one further comonomer, for example α-olefins such as propylene, butylene (1-butene), 1-hexene, 1-octene, 1-decene, 1-dodecene, 1-pentene, and also isobutene, vinylaromatics, for example styrene, and also (meth)acrylic acid, vinyl acetate, vinyl propionate, $C_1$-$C_{10}$-alkyl esters of (meth)acrylic acid, especially methyl acrylate, methyl methacrylate, ethyl acrylate, ethyl methacrylate, n-butyl acrylate, 2-ethylhexyl acrylate, n-butyl methacrylate, 2-ethylhexyl methacrylate, and also maleic acid, maleic anhydride and itaconic anhydride. Polyethylene may be HDPE or LDPE.

In the context of the present invention, polypropylene is not only understood to mean homopolypropylene, but also copolymers of propylene which comprise at least 50 mol % of copolymerized propylene and up to 50 mol % of at least one further comonomer, for example ethylene and α-olefins such as butylene, 1-hexene, 1-octene, 1-decene, 1-dodecene and 1-pentene. Polypropylene is preferably isotactic or essentially isotactic polypropylene.

In the context of the present invention, polystyrene is not only understood to mean homopolymers of styrene, but also copolymers with acrylonitrile, 1,3-butadiene, (meth)acrylic acid, $C_1$-$C_{10}$-alkyl esters of (meth)acrylic acid, divinylbenzene, especially 1,3-divinylbenzene, 1,2-diphenylethylene and α-methylstyrene.

Another preferred binder is polybutadiene.

Other suitable binders are selected from polyethylene oxide (PEO), cellulose, carboxymethylcellulose, polyimides and polyvinyl alcohol.

In one embodiment of the present invention, binder is selected from those (co)polymers which have a mean molecular weight $M_w$ in the range from 50 000 to 1 000 000 g/mol, preferably to 500 000 g/mol.

Binders may be crosslinked or uncrosslinked (co)polymers.

In a particularly preferred embodiment of the present invention, binder is selected from halogenated (co)polymers, especially from fluorinated (co)polymers. Halogenated or fluorinated (co)polymers are understood to mean those (co)polymers which comprise at least one (co)polymerized (co)monomer which has at least one halogen atom or at least one fluorine atom per molecule, more preferably at least two halogen atoms or at least two fluorine atoms per molecule.

Examples are polyvinyl chloride, polyvinylidene chloride, polytetrafluoroethylene, polyvinylidene fluoride (PVdF), tetrafluoroethylene-hexafluoropropylene copolymers, vinylidene fluoride-hexafluoropropylene copolymers (PVdF-HFP), vinylidene fluoride-tetrafluoroethylene copolymers, perfluoroalkyl vinyl ether copolymers, ethylene-tetrafluoroethylene copolymers, vinylidene fluoride-chlorotrifluoroethylene copolymers and ethylene-chlorofluoroethylene copolymers.

Suitable binders are especially polyvinyl alcohol and halogenated (co)polymers, for example polyvinyl chloride or polyvinylidene chloride, especially fluorinated (co)polymers such as polyvinyl fluoride and especially polyvinylidene fluoride and polytetrafluoroethylene.

Electrically conductive, carbon-containing material can be selected, for example, from graphite, carbon black, carbon nanotubes, graphene or mixtures of at least two of the aforementioned substances. In the context of the present invention, electrically conductive, carbon-containing material can also be referred to as carbon (B) for short.

In one embodiment of the present invention, electrically conductive, carbon-containing material is carbon black. Carbon black may, for example, be selected from lamp black, furnace black, flame black, thermal black, acetylene black and industrial black. Carbon black may comprise impurities, for example hydrocarbons, especially aromatic hydrocarbons, or oxygen-containing compounds or oxygen-containing groups, for example OH groups. In addition, sulfur- or iron-containing impurities are possible in carbon black.

In one variant, electrically conductive, carbon-containing material is partially oxidized carbon black.

In one embodiment of the present invention, electrically conductive, carbon-containing material comprises carbon nanotubes. Carbon nanotubes (CNTs for short), for example single-wall carbon nanotubes (SW CNTs) and preferably multiwall carbon nanotubes (MW CNTs), are known per se. A process for production thereof and some properties are described, for example, by A. Jess et al. in *Chemie Ingenieur Technik* 2006, 78, 94-100.

In one embodiment of the present invention, carbon nanotubes have a diameter in the range from 0.4 to 50 nm, preferably 1 to 25 nm.

In one embodiment of the present invention, carbon nanotubes have a length in the range from 10 nm to 1 mm, preferably 100 nm to 500 nm.

Carbon nanotubes can be prepared by processes known per se. For example, a volatile carbon compound, for example methane or carbon monoxide, acetylene or ethylene, or a mixture of volatile carbon compounds, for example synthesis gas, can be decomposed in the presence of one or more reducing agents, for example hydrogen and/or a further gas, for example nitrogen. Another suitable gas mixture is a mixture of carbon monoxide with ethylene. Suitable temperatures for decomposition are, for example, in the range from 400 to 1000° C., preferably 500 to 800° C. Suitable pressure conditions for the decomposition are, for example, in the range from standard pressure to 100 bar, preferably to 10 bar.

Single- or multiwall carbon nanotubes can be obtained, for example, by decomposition of carbon-containing compounds in a light arc, specifically in the presence or absence of a decomposition catalyst.

In one embodiment, the decomposition of volatile carbon-containing compound or carbon-containing compounds is performed in the presence of a decomposition catalyst, for example Fe, Co or preferably Ni.

In the context of the present invention, graphene is understood to mean almost ideally or ideally two-dimensional hexagonal carbon crystals with a structure analogous to single graphite layers.

In one embodiment of the present invention, the weight ratio of inventive modified mixed transition metal oxide and electrically conductive, carbon-containing material is in the range from in the range from 200:1 to 5:1, preferably 100:1 to 10:1.

A further aspect of the present invention is an electrode comprising at least one inventive mixed transition metal oxide, at least one electrically conductive, carbon-containing material and at least one binder.

Inventive mixed transition metal oxide and electrically conductive, carbon-containing material have been described above.

The present invention further provides electrochemical cells produced using at least one inventive electrode. The present invention further provides electrochemical cells comprising at least one inventive electrode.

In one embodiment of the present invention, inventive electrode material comprises:
in the range from 60 to 98% by weight, preferably 70 to 96% by weight, of inventive modified mixed transition metal oxide,
in the range from 1 to 20% by weight, preferably 2 to 15% by weight, of binder,
in the range from 1 to 25% by weight, preferably 2 to 20% by weight, of electrically conductive, carbon-containing material.

The geometry of inventive electrodes can be selected within wide limits. It is preferred to configure inventive electrodes in thin films, for example in films with a thickness in the range from 10 μm to 250 μm, preferably 20 to 130 μm.

In one embodiment of the present invention, inventive electrodes comprise a foil, for example a metal foil, especially an aluminum foil, or a polymer film, for example a polyester film, which may be untreated or siliconized.

The present invention further provides for the use of inventive electrode materials or inventive electrodes in electrochemical cells. The present invention further provides a process for producing electrochemical cells using inventive electrode material or inventive electrodes. The present invention further provides electrochemical cells comprising at least one inventive electrode material or at least one inventive electrode.

By definition, inventive electrodes in inventive electrochemical cells serve as cathodes. Inventive electrochemical cells comprise a counter-electrode, which is defined as the anode in the context of the present invention, and which may, for example, be a carbon anode, especially a graphite anode, a lithium anode, a silicon anode or a lithium titanate anode.

Inventive electrochemical cells may, for example, be batteries or accumulators.

Inventive electrochemical cells may comprise, in addition to the anode and inventive electrode, further constituents, for example conductive salt, nonaqueous solvent, separator, output conductor, for example made from a metal or an alloy, and also cable connections and housing.

In one embodiment of the present invention, inventive electrical cells comprise at least one nonaqueous solvent which may be liquid or solid at room temperature, preferably selected from polymers, cyclic or noncyclic ethers, cyclic and noncyclic acetals and cyclic or noncyclic organic carbonates.

Examples of suitable polymers are especially polyalkylene glycols, preferably poly-$C_1$-$C_4$-alkylene glycols and especially polyethylene glycols. These polyethylene glycols may comprise up to 20 mol % of one or more $C_1$-$C_4$-alkylene glycols in copolymerized form. The polyalkylene glycols are preferably polyalkylene glycols double-capped by methyl or ethyl.

The molecular weight $M_w$ of suitable polyalkylene glycols and especially of suitable polyethylene glycols may be at least 400 g/mol.

The molecular weight $M_w$ of suitable polyalkylene glycols and especially of suitable polyethylene glycols may be up to 5 000 000 g/mol, preferably up to 2 000 000 g/mol.

Examples of suitable noncyclic ethers are, for example, diisopropyl ether, di-n-butyl ether, 1,2-dimethoxyethane, 1,2-diethoxyethane, preference being given to 1,2-dimethoxyethane.

Examples of suitable cyclic ethers are tetrahydrofuran and 1,4-dioxane.

Examples of suitable noncyclic acetals are, for example, dimethoxymethane, diethoxymethane, 1,1-dimethoxyethane and 1,1-diethoxyethane.

Examples of suitable cyclic acetals are 1,3-dioxane and especially 1,3-dioxolane.

Examples of suitable noncyclic organic carbonates are dimethyl carbonate, ethyl methyl carbonate and diethyl carbonate.

Examples of suitable cyclic organic carbonates are compounds of the general formulae (I) and (II)

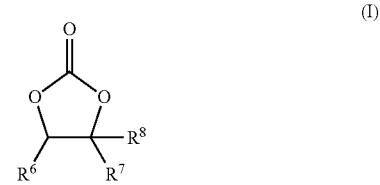

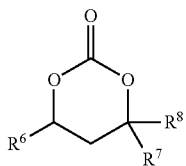

(II)

in which $R^6$, $R^7$ and $R^8$ may be the same or different and are selected from hydrogen and $C_1$-$C_4$-alkyl, for example methyl, ethyl, n-propyl, isopropyl, n-butyl, isobutyl, sec-butyl and tert-butyl, where $R^7$ and $R^8$ are preferably not both tert-butyl.

In particularly preferred embodiments, $R^6$ is methyl and $R^7$ and $R^8$ are each hydrogen, or $R^6$, $R^7$ and $R^8$ are each hydrogen.

Another preferred cyclic organic carbonate is vinylene carbonate, formula (III).

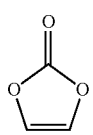

(III)

The solvent(s) is (are) preferably used in what is known as the anhydrous state, i.e. with a water content in the range from 1 ppm to 0.1% by weight, determinable, for example, by Karl Fischer titration.

Inventive electrochemical cells further comprise one or more conductive salts. Suitable conductive salts are especially lithium salts. Examples of suitable lithium salts are $LiPF_6$, $LiBF_4$, $LiClO_4$, $LiAsF_6$, $LiCF_3SO_3$, $LiC(C_nF_{2n+1}SO_2)_3$, lithium imides such as $LiN(C_nF_{2n+1}SO_2)_2$, where n is an integer in the range from 1 to 20, $LiN(SO_2F)_2$, $Li_2SiF_6$, $LiSbF_6$, $LiAlCl_4$, and salts of the general formula $(C_nF_{2n+1}SO_2)_tYLi$, where m is defined as follows:
t=1 when Y is selected from oxygen and sulfur,
t=2 when Y is selected from nitrogen and phosphorus, and
t=3 when Y is selected from carbon and silicon.

Preferred conductive salts are selected from $LiC(CF_3SO_2)_3$, $LiN(CF_3SO_2)_2$, $LiPF_6$, $LiBF_4$, $LiClO_4$, particular preference being given to $LiPF_6$ and $LiN(CF_3SO_2)_2$.

In one embodiment of the present invention, inventive electrochemical cells comprise one or more separators by which the electrodes are mechanically separated. Suitable separators are polymer films, especially porous polymer films, which are unreactive toward metallic lithium. Particularly suitable materials for separators are polyolefins, especially porous polyethylene in film form and porous polypropylene in film form.

Separators made from polyolefin, especially made from polyethylene or polypropylene, may have a porosity in the range from 35 to 45%. Suitable pore diameters are, for example, in the range from 30 to 500 nm.

In another embodiment of the present invention, separators may be selected from PET nonwovens filled with inorganic particles. Such separators may have a porosity in the range from 40 to 55%. Suitable pore diameters are, for example, in the range from 80 to 750 nm.

Inventive electrochemical cells further comprise a housing which may have any desired shape, for example cuboidal or the shape of a cylindrical disk. In one variant, the housing used is a metal foil elaborated as a pouch.

Inventive electrochemical cells give a high voltage and are notable for a high energy density and good stability.

Inventive electrochemical cells can be combined with one another, for example in series connection or in parallel connection. Series connection is preferred.

The present invention further provides for the use of inventive electrochemical cells in units, especially in mobile units. Examples of mobile units are vehicles, for example automobiles, motorcycles, aircraft, or water vehicles such as boats or ships. Other examples of mobile units are those which are moved manually, for example computers, especially laptops, phones, or electrical hand tools, for example from the building sector, especially drills, battery-powered drills or battery-powered tackers.

The use of inventive electrochemical cells in units gives the advantage of a longer run time before recharging. If it were desired to achieve the same run time with electrochemical cells with lower energy density, a higher weight would have to be accepted for electrochemical cells.

The invention is illustrated by working examples.

General remark: I (STP) represents standard liters. Figures in % are percentages by weight, unless explicitly stated otherwise.

I. Preparation of Precursors Modified in Accordance with the Invention and Further Processing to Mixed Transition Metal Oxides I.1 Preparation of the Precursor of a Mixed Transition Metal Oxide MP-TM.1 Modified in Accordance with the Invention and Further Processing 100 g of $Ni_{0.25}Mn_{0.75}(OH)_2$ are suspended in 100 g of triethyl borate $B(OC_2H_5)_3$ (B-1). The suspension thus obtained is stirred under nitrogen at 60° C. for one hour. Subsequently, the suspension is filtered through a glass frit. This gives a precursor MP-TM.1 modified in accordance with the invention.

The modified precursor thus obtainable is subsequently mixed with $Li_2CO_3$ (molar Li:Ni:Mn ratio such as 0.5:0.25:0.75) and calcined in a muffle furnace at 850° C. for 12 hours. This gives an inventive modified mixed transition metal oxide with spinel structure from the modified precursor.

I.2 Preparation of the Precursor of a Mixed Transition Metal Oxide MP-TM.2 Modified in Accordance with the Invention and Further Processing A mixture of a precursor $Ni_{0.5}Co_{0.2}Mn_{0.3}(OH)_2$ and $Li_2CO_3$ in a molar ratio of 1:0.55 is calcined continuously in a rotary tube furnace at 600° C., the mean residence time in the rotary tube furnace being 1 hour. A gas stream consisting of 95% air and 5% $O=P(CH_3)(OCH_3)_2$ is passed through the rotary tube furnace (inlet temperature: 200° C., 500 l (STP)/h). This gives a precursor MP-TM.2 modified in accordance with the invention.

The black powder thus obtained is subsequently calcined at 850° C. in a muffle furnace under air for 12 h. This gives an inventive modified mixed transition metal oxide with layer structure.

I.3 Preparation of the Precursor of a Mixed Transition Metal Oxide MP-TM.3 Modified in Accordance with the Invention and Further Processing Treatment with $AlF_3$ Generated In Situ:

100 g of an $Ni_{0.33}Co_{0.33}Mn_{0.33}(OH)_2$ precursor are suspended in 1000 g of water and stirred at 50° C. Subsequently, 10% by weight aqueous solutions of aluminum nitrate and ammonium fluoride are added successively, such that the molar ratio of Al:F:Ni:Co:Mn is 0.01:0.03:0.33:0.33:0.33. Subsequently, the suspension is stirred at 50° C. for 2 h and then filtered and dried at 100° C. This gives the precursor MP-TM.3 modified in accordance with the invention with AlF$_3$.

The precursor thus modified is subsequently mixed with Li$_2$CO$_3$ in a molar ratio of 1:0.55 and calcined in a muffle furnace at 850° C. for 12 h. This gives an inventive modified mixed transition metal oxide with layer structure.

II. General Method for Production of Electrodes and Test Cells

Materials Used:

Electrically Conductive, Carbon-Containing Materials:

Carbon (C-1): carbon black, BET surface area of 62 m$^2$/g, commercially available as "Super P Li" from Timcal Binder (BM.1): copolymer of vinylidene fluoride and hexafluoropropene, in powder form, commercially available as Kynar Flex® 2801 from Arkema, Inc.

Figures in % are based on percentages by weight, unless explicitly stated otherwise.

To determine the electrochemical data of the materials, 8 g of mixed transition metal oxide modified in accordance with the invention from example 1.1, 1 g of carbon (C-1) and 1 g of (BM.1), with addition of 24 g of N-methylpyrrolidone (NMP), are mixed to give a paste. A 30 μm-thick aluminum foil is coated with the above-described paste (active material loading 5-7 mg/cm$^2$). After drying at 105° C., circular parts of the aluminum foil thus coated (diameter 20 mm) are punched out. The electrodes thus obtainable are used to produce electrochemical cells.

After drying at 105° C., circular electrodes (diameter 20 mm) are punched out and built into test cells. The electrolyte used is a 1 mol/l solution of LiPF$_6$ in ethylene carbonate/dimethyl carbonate (1:1 based on parts by mass). The anode of the test cells consists of a lithium foil which is in contact with the cathode foil via a separator made from glass fiber paper.

This gives inventive electrochemical cells EZ.1.

The inventive electrochemical cells are subjected to cycling (charging/discharging) between 4.9 V and 3.5 V at 25° C. in 100 cycles. The charging and discharging currents are 150 mA/g of cathode material. The retention of the discharge capacity after 100 cycles is determined.

Inventive electrochemical cells show an advantage in cycling stability.

The invention claimed is:

1. A process for preparing modified mixed transition metal oxides, which comprises:
    treating a precursor of a mixed transition metal oxide which comprises lithium and at least two transition metals as cations with a boron compound having at least one phenoxy or alkoxy group or at least one halogen per mole,
    thereby obtaining a modified mixed transition metal oxide.

2. The process according to claim 1, wherein the treatment is performed at temperatures in the range from −20 to +1200° C.

3. The process according to claim 1, wherein the treatment is performed at the same time as or before the reaction of the precursor with at least one lithium compound, which is selected from LiOH, Li$_2$CO$_3$, Li$_2$O and LiNO$_3$.

4. The process according to claim 1, wherein compounds of boron are compounds represented by formula B(X$^1$)$_a$(R$^2$)$_{3-a}$, where the variables are each defined as follows:
    X$^1$ are the same or different and are each selected from fluorine, chlorine, bromine, iodine and O—C$_1$-C$_6$-alkyl, cyclic or linear,
    R$^2$ are the same or different and are each selected from phenyl and C$_1$-C$_6$-alkyl, and
    a is in the range from one to three.

5. The process according to claim 1, wherein the precursor selected for a mixed oxide is at least one hydroxide, phosphate, oxyhydroxide or carbonate of at least one element of groups 3 to 12 of the Periodic Table of the Elements.

6. The process according to claim 1, wherein the precursor of a mixed oxide, which comprises lithium and at least two transition metals as cations, is exposed to a gas atmosphere which comprises nitrogen or oxygen and at least one gaseous substance which is selected from compounds of boron having at least one alkoxy group or at least one halogen.

7. The process according to claim 1, wherein the modified mixed transition metal oxide does not contain nickel.

8. The process according to claim 1, wherein the modified mixed transition metal oxide comprises lithium and at least two transition metals selected from the group consisting of cobalt, titanium, vanadium, chromium, manganese, and iron.

9. The process according to claim 1, wherein said treating is carried out by contacting the precursor with said at least one substance, said precursor being in the solid phase and said at least one substance being in the gas phase; or
    said treating is carried out by contacting the precursor with said at least one substance, each of said precursor and said at least one substance being dissolved in a liquid phase; and
    thereafter, isolating the modified mixed transition metal oxide.

10. A process for preparing modified mixed transition metal oxides, which comprises:
    contacting a mixed transition metal oxide that comprises at least two transition metals as cations with a boron compound having at least one phenoxy or alkoxy group or at least one halogen per mole, thereby obtaining a treated mixed transition metal oxide, and, thereafter,
    reacting the treated mixed transition metal oxide with a lithium compound, which is selected from the group consisting of LiOH, Li$_2$CO$_3$, Li$_2$O, LiNO$_3$, and a combination thereof, thereby obtaining a modified mixed transition metal oxide comprising lithium and said at least two transition metals,
    wherein
    said at least two transition metals are at least two transition metals selected from the group consisting of nickel, cobalt, titanium, vanadium, chromium, manganese, and iron,
    said mixed transition metal oxide that comprises at least two transition metals as cations does not comprise lithium, and
    said contacting is carried out in the absence of any lithium compounds.

* * * * *